United States Patent [19]
Yoshida

[11] Patent Number: 4,874,543
[45] Date of Patent: Oct. 17, 1989

[54] LIQUID CRYSTAL COMPOSITION

[75] Inventor: Tetsushi Yoshida, Tokyo, Japan

[73] Assignee: Casio Computer Co., Ltd., Tokyo, Japan

[21] Appl. No.: 120,091

[22] Filed: Nov. 12, 1987

[30] Foreign Application Priority Data

Nov. 14, 1986 [JP] Japan .......................... 61-270928

[51] Int. Cl.$^4$ .................. C09K 19/06; C09K 19/4; C09K 19/30; C09K 19/34
[52] U.S. Cl. ................. 252/299.61; 252/299.5; 252/299.6; 252/299.63; 252/299.66; 350/350 R
[58] Field of Search .............. 350/350 R; 252/299.5, 252/299.6, 299.63, 299.61, 299.66

[56] References Cited

U.S. PATENT DOCUMENTS

| | | | |
|---|---|---|---|
| 3,925,482 | 12/1975 | Jacques | 252/299.6 |
| 4,439,015 | 3/1984 | Rich et al. | 252/299.63 |
| 4,469,618 | 9/1984 | Hasegawa et al. | 252/299.63 |
| 4,483,595 | 11/1984 | Irving et al. | 252/299.63 |
| 4,550,980 | 11/1985 | Shingu | 252/299.63 |
| 4,556,745 | 12/1986 | Carr et al. | 252/299.63 |
| 4,622,162 | 11/1986 | Kimura et al. | 252/299.63 |
| 4,643,841 | 2/1987 | Ishii et al. | 252/299.61 |
| 4,654,421 | 3/1987 | Tanaka et al. | 252/299.63 |
| 4,670,182 | 6/1987 | Fujita et al. | 252/299.63 |
| 4,713,468 | 12/1987 | Takatsu et al. | 252/299.63 |
| 4,726,910 | 2/1988 | Takatsu et al. | 252/299.5 |

FOREIGN PATENT DOCUMENTS

| | | | |
|---|---|---|---|
| EP178937 | 4/1986 | European Pat. Off. | 252/299.6 |
| 61-97383 | 5/1986 | Japan | 252/299.6 |
| 61-97384 | 5/1986 | Japan | 252/299.6 |
| 61291536 | 12/1986 | Japan | 252/299.63 |
| 168683 | 1/1986 | European Pat. Off. | 252/299.63 |
| 97383 | 5/1986 | Japan | 252/299.6 |
| 97384 | 5/1986 | Japan | 252/299.6 |
| 62-13484 | 1/1987 | Japan | 252/299.5 |
| 2189785 | 11/1987 | United Kingdom | 252/299.63 |

OTHER PUBLICATIONS

Takatsu, H., et al., Mol. Cryst. Liq. Cryst., vol. 141(3-4), pp. 279–287 (1986).

*Primary Examiner*—Teddy S. Gron
*Attorney, Agent, or Firm*—Frishauf, Holtz, Goodman & Woodward

[57] ABSTRACT

A liquid crystal composition includes a tolan liquid crystal compound having a large optical anisotropy, another tolan liquid crystal compound having a large optical anisotropy and a high N-I point, a low-viscosity polycyclic liquid crystal compound (wherein the rings are directly bonded together) having an alkyl or alkoxy group, and a polycyclic liquid crystal compound (wherein the rings are directly bonded together) having a large optical anisotropy and a cyano group with a large dielectric anisotropy $\Delta\epsilon$. These compounds are mixed so as to obtain a positive dielectric anisotropy.

27 Claims, No Drawings

LIQUID CRYSTAL COMPOSITION

BACKGROUND OF THE INVENTION

1. Field of the Invention

The present invention relates to a liquid crystal composition suitable for a field effect liquid crystal display device driven by multiplex driving and, more particularly, to a liquid crystal composition suitable for use in a television image display device.

2. Description of the Prior Art

A liquid crystal matrix display using a field effect twisted nematic (TN) mode has been used in a variety of image display devices such as a display device of a computer terminal and a television receiver. Matrix type liquid crystal devices are frequently used in such image display device. The matrix type liquid crystal devices include a plurality of pixels arranged in a matrix form at a plurality of intersections of a plurality of electrodes formed on the inner surfaces of opposed substrates. These pixels are multiplex-driven.

In recent years, a strong demand has arisen for a large screen and high image quality in the image display device. For this purpose, the number of pixels must be increased, and contrast must be improved.

A negative display type TN liquid crystal device is used as a liquid crystal device capable of displaying a television image since this liquid crystal device visually has high contrast and can perform clear gradation display. In order to increase the number of pixels to increase a resolution or enlarge a display area, the number of scanning lines is inevitably increased, and high-duty multiplex driving must be performed. In such high-duty multiplex driving, however, a difference between the effective voltages of ON and OFF electric fields for turning on and off each pixel is inevitably decreased. Therefore, the operation margin of the drive voltage is reduced and contrast is degraded.

The operation margin and contrast of the liquid crystal display device depend on voltage-luminance characteristics. More specifically, when a change in transmissivity in response to a change in intensity of the electric field applied to the liquid crystal is abrupt, the operation margin can correspondingly be increased and contrast can be improved. Steepness of the voltage-luminance characteristic curve is represented by a ratio $\gamma$ of voltage $V_{50}$ at which transmittance becomes 50% to threshold voltage Vth (referred to as a $\gamma$ value hereinafter). When the $\gamma$ value comes close to 1, the change in transmittance is abrupt and the operation margin can be increased. In this case, contrast can also be improved. The liquid crystal display device driven by high-duty multiplex driving must respond quickly since one selection period within which scanning signals are supplied to one scanning line is inevitably shortened.

The $\gamma$ characteristics have been studied by M. Schadt et al. According to their studies, the $\gamma$ value representing steepness of the voltage-luminance characteristic curve is represented by equation (1) below and coincides with the measured value:

$$\begin{aligned}\gamma &= V50/VTH \\ &= \{2.044 - 1.044/(1 + K33/K11)\}[1 + \\ &\quad 0.123\{(\Delta\epsilon/\epsilon\perp)^{0.6} - 1\}]\{1 + \\ &\quad 0.132\ln(\Delta nd/2\lambda)\} \end{aligned} \quad (1)$$

where

V50: the voltage at which transmittance becomes 50%

Vth: the threshold voltage

K11: the splay elastic constant of the liquid crystal

K33: the bent elastic constant of the liquid crystal $\Delta\epsilon$: the dielectric anisotropy of the liquid crystal $\epsilon\perp$: the dielectric constant in a direction perpendicular to the axis of the liquid crystal molecule $\Delta n$: the optical anisotropy of the liquid crystal d: the layer thickness of the liquid crystal According to equation (1), in order to obtain the $\gamma$ value near 1, the values of the first, second, and third terms must be near 1.

ON and OFF times tON and tOFF of the liquid crystal display device are represented by equations (2) and (3) and coincide with the measured values:

$$tON = \eta d^2/\{\pi^2 K(V^2/Vth^2 - 1)\} \quad (2)$$

$$tOFF = \eta/Kq^2 \quad (3)$$

for $q = \pi/d$, $K = K11 + (K33 - 2K22)/4$, and $$Vth = \pi\sqrt{k/\epsilon 0 \Delta\epsilon}$$

where $\eta$: the viscosity $\epsilon 0$: the dielectric constant in vacuum

K22: twist elastic constant

According to equations (2) and (3), the response time of the liquid crystal display device is proportional to the viscosity of the liquid crystal and is proportional to the square of the liquid crystal layer thickness (i.e., the gap between the electrodes) d.

In a conventional liquid crystal display device, in order to improve the $\gamma$ characteristic, the value of product $\Delta n.d$ of optical anisotropy $\Delta n$ and liquid crystal layer thickness d is set to fall within the range of 1.0 to 1.1 since the center of the waveform band of visible band falls within the range of 500 to 550 nm. In order to multiplex drive such a conventional liquid crystal display device, transmitted light during the OFF state of the device appears to be colored due to the influence of wavelength dependency which is caused by optical rotatory dispersion during propagation through the liquid crystal layer. In the negative type liquid crystal device, the long wavelength component of the transmitted light has a higher transmittance than the short wavelength component thereof. As a result, the entire screen of the liquid crystal display device undesirably becomes reddish, i.e., sepia.

This is because a bias voltage is always applied to the OFF pixels by drive signals of high-duty multiplex driving. The liquid crystal molecules are slightly inclined from a direction parallel to the substrate surface. As a result, optical anisotropy $\Delta n$ of the liquid crystal layer of the OFF pixels is apparently smaller than the value for the initial orientation state, and the transmittance of the long wavelength component is increased.

In order to solve the problem of coloring, the value of product $\Delta n \cdot d$ must be increased. In order to increase product $\Delta n \cdot d$, optical anisotropy $\Delta n$ and/or thickness d of the liquid crystal layer must be increased. When thickness d is increased, the response time is greatly prolonged because the response time is proportional to the square of thickness d, as described above. A liquid crystal compound having large optical anisotropy $\Delta n$ has a higher viscosity and increases the viscosity of the liquid crystal composition, thereby making the response time prolonged. Therefore, it has been required that a liquid crystal composition used in a liquid crystal display device multiplex driven at high speed have a large $\Delta n$ and a low viscosity.

In order to improve the $\gamma$ characteristic, it is seen from equation (1) that ratio $\Delta \epsilon / \epsilon_\perp$ of dielectric anisotropy $\Delta \epsilon$ of the liquid crystal composition to dielectric constant $\epsilon_\perp$ in a direction perpendicular to the axis of the liquid crystal molecule must be decreased. In order to decrease this ratio, the value of dielectric anisotropy $\Delta \epsilon$ is decreased, or the value of $\epsilon_\perp$ is increased. If the content of a liquid crystal compound having positive dielectric anisotropy is decreased and the value of $\Delta \epsilon$ of the liquid crystal composition is decreased, the response time is prolonged since the value of $\Delta \epsilon$ is small. If the content of a liquid crystal compound having a large value of $\epsilon_\perp$ is increased and the value of $\epsilon_\perp$ is large, the viscosity of the resultant liquid crystal composition is increased and the response time is prolonged since the liquid crystal compound having a larger value of $\epsilon_\perp$ has a high viscosity.

A demand has arisen for a liquid crystal composition having a low viscosity, a small ratio $\Delta \epsilon / \epsilon_\perp$ while the response time is short even if the value of dielectric anisotropy $\Delta \epsilon$ is small and the $\gamma$ characteristic is good.

A conventional liquid crystal composition having a large $\Delta n$ is prepared as follows. A polycyclic cyanophenylcyclohexane or cyanobiphenyl liquid crystal compound having a relatively large $\Delta n$ is used to prepare a liquid crystal material for increasing the value of $\Delta \epsilon$. A liquid crystal compound containing three or more benzene and/or cyclohexane rings is used to prepare a liquid crystal material for elevating the N-I point. A low-viscosity liquid crystal compound is used to prepare a low-viscosity liquid crystal material. These materials are mixed to obtain a liquid crystal composition having a large $\Delta n$.

However, the value of optical anisotropy $\Delta n$ of such a liquid crystal composition is a maximum of about 0.10 to 0.15 and is not sufficiently large.

A liquid crystal composition aiming at increasing $\Delta n$ by using a tolan liquid crystal compound having a large $\Delta n$ is disclosed in Japanese Patent Disclosure Nos. 61-97383 and 61-97384, and European Patent No. 178937. This liquid crystal composition mainly contains a tolan liquid crystal compound having a large $\Delta n$, a liquid crystal compound having an ester bond, and an NP liquid crystal compound having a cyano group at its terminal and a large $\Delta \epsilon$.

Since such a conventional liquid crystal composition contains a tolan liquid crystal compound having a large $\Delta n$, the optical anisotropy of the resultant composition is relatively large. In addition, since the compound having an ester bond is contained in the composition, a smectic phase tends not to appear in a low-temperature atmosphere. A phenyl cyclohexanecarboxylate liquid crystal compound having the ester bond has a small $\Delta n$, and therefore the optical anisotropy of the composition is not so high (about 0.175 at most). The liquid crystal compound having the ester bond has a relatively high viscosity among liquid crystal compounds having a low viscosity. For example, the liquid crystal compound having the ester bond has a viscosity of about 20 cp. For this reason, the viscosity of the liquid crystal composition containing such a liquid crystal compound has a high viscosity, e.g., 28 cp or more. Therefore, a liquid crystal display device using this liquid crystal composition cannot solve the problem of coloring described above since the value of $\Delta n$ of the liquid crystal composition is not so large. In addition, the response time of the display device is long because the composition has a high viscosity.

When the content of the tolan liquid crystal compound having a large $\Delta n$ is increased in order to increase $\Delta n$ in the conventional liquid crystal composition, crystals tend to precipitate since the tolan liquid crystal compound has poor compatibility. Further, when a liquid crystal composition having a large $\Delta n$ and a small $\Delta \epsilon / \epsilon_\perp$ is prepared by reducing the content of the NP liquid crystal compound having large positive dielectric anisotropy $\Delta \epsilon$ in order to improve the $\gamma$ characteristic, the compatibility is degraded and the crystals can easily precipitate. In addition, the viscosity is increased, so that response time is prolonged.

As described above, the conventional liquid crystal compositions do not have a large $\Delta n$ and have a high viscosity as well as the narrow temperature range within which the nematic phase appears. As a result, in liquid crystal display devices using the conventional liquid crystal compositions, a display screen is colored, the response time is prolonged, and the usable temperature range is narrow.

SUMMARY OF THE INVENTION

The present invention has been made to solve the conventional problems described above, and has as its object to provide a liquid crystal composition having a large optical anisotropy $\Delta n$, a low viscosity, and a wide temperature range of the nematic phase.

In order to achieve the object of the present invention, there is provided a liquid crystal composition, comprising:

30 to 60 wt % of a first liquid crystal material comprising at least one liquid crystal compound represented by formula (I):

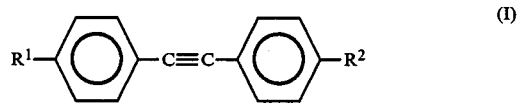

wherein $R^1$ represents a straight-chain alkyl group having 2 to 5 carbon atoms, and $R^2$ represents a straight-chain alkyl or alkoxy group having 1 to 5 carbon atoms;

1 to 20 wt % of a second liquid crystal material comprising at least one liquid crystal compound represented by formula (II):

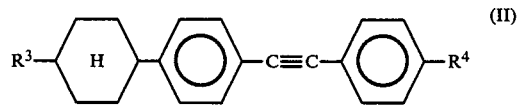

wherein $R^3$ represents a straight-chain alkyl group having 2 to 4 carbon atoms and $R^4$ represents a straight-chain alkyl group having 1 to 4 carbon atoms;

10 to 30 wt % of a third liquid crystal material containing a liquid crystal compound represented by formula (III) and selectively a liquid crystal compound represented by formula (IV):

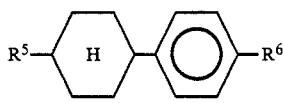
(III)

and

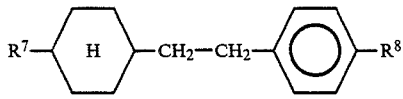
(IV)

wherein each of $R^5$ and $R^7$ independently represents a straight-chain alkyl group having 2 to 5 carbon atoms, $R^6$ represents a straight-chain alkyl or alkoxy group having 2 to 5 carbon atoms, or $-O-CH_2-CH=CH-CH_3$, and $R^8$ represents an alkoxy group having 2 to 4 carbon atoms; and 5 to 50 wt % of a fourth liquid crystal material comprising at least one member selected from liquid crystal compounds represented by formulas (V) to (VII):

(V)

(VI)

and

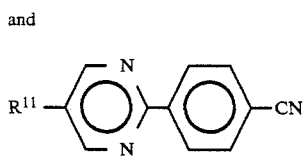
(VII)

wherein each of $R^9$ and $R^{10}$ independently represents a straight-chain alkyl group having 2 to 5 carbon atoms, and $R^{11}$ represents a straight-chain alkyl group having 4 to 7 carbon atoms.

The liquid crystal composition prepared according to the present invention has a large content of the tolan liquid crystal compound having a large optical anisotropy Δn. As a result, the value of the optical anisotropy Δn of the resultant composition is large. The liquid crystal composition of the present invention contains the phenylcyclohexane liquid crystal compound having an alkyl or alkoxy group at its terminal having a very low viscosity to adjust the viscosity of the composition. As compared with the liquid crystal composition whose viscosity is controlled using a liquid crystal compound containing an ester group, the composition of the present invention has a very low viscosity.

When a phenylcyclohexane liquid crystal compound having $-O-CH_2-CH=CH-CH_3$ at its terminal is used as a liquid crystal compound for controlling the viscosity, the temperature range of the nematic phase can be widened without reducing optical anisotropy and appearance of the smectic phase can be inhibited since the liquid crystal compound has a large optical anisotropy, a high N-I point (nematic-isotropic transition point) and good compatibility with the tolan liquid crystal compound. The liquid crystal compound represented by formula (IV) has a small optical anisotropy but has a relatively low viscosity and is compatible with the tolan liquid crystal compound. Therefore, a liquid crystal composition containing this liquid crystal compound has a low viscosity and a wide temperature range of the nematic phase.

DETAILED DESCRIPTION OF THE PREFERRED EMBODIMENTS

According to the present invention, a tolan liquid crystal compound having a large optical anisotropy, another tolan liquid crystal compound having a large optical anisotropy and a high N-I point, a low-viscosity polycyclic liquid crystal compound (wherein the rings are directly bonded together) having an alkyl or alkoxy group, and a polycyclic liquid crystal compound (wherein the rings are directly bonded together) having a large optical anisotropy and a cyano group with a large dielectric anisotropy Δε are mixed to obtain a positive dielectric anisotropy, thereby preparing the liquid crystal composition of the present invention. A polycyclic liquid crystal compound having $-O-CH_2-CH=CH-CH_3$ at its terminal, a relatively large optical anisotropy, and good compatibility with a tolan liquid crystal compound, and/or a cyclohexane phenyl ethane liquid crystal compound having a relatively low viscosity and good compatibility with a tolan liquid crystal compound may be used as needed.

A liquid crystal compound used for increasing the optical anisotropy Δn in the liquid crystal composition of the present invention is a tolan liquid crystal compound represented by formula (I):

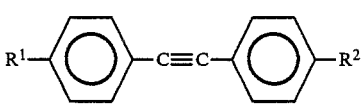
(I)

wherein $R^1$ represents a straight-chain alkyl group having 2 to 5 carbon atoms, and $R^2$ represents a straight-chain alkyl or alkoxy group having 1 to 5 carbon atoms.

Of the liquid crystal compounds represented by formula (I), a compound having an alkoxy group as $R^2$ has a relatively low viscosity (about 20 cp), a large optical anisotropy (Δn=0.2 or more), and a relatively high N-I point (70° to 96° C.).

Of the liquid crystal compounds represented by formula (I), a compound having an alkyl group as $R^2$ has a low viscosity (15 cp or less) and a large optical anisotropy (Δn=0.18 or more).

One or more of the liquid crystal compounds represented by formula (I) are mixed to prepare the first liquid crystal material.

A tolan liquid crystal compound having three rings and represented by formula (II) may be used as a liquid crystal compound for increasing the optical anisotropy Δn:

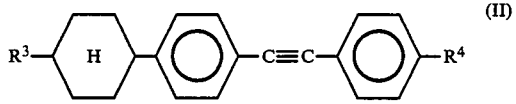

(II)

wherein $R^3$ represents a straight-chain alkyl group having 2 to 4 carbon atoms, and $R^4$ carbon atoms.

The liquid crystal compound represented by formula (II) is a high-temperature liquid crystal compound with a large $\Delta n$ (0.2 or more) (N-I point: 190° to 210° C.). Therefore, this liquid crystal compound is used for increasing the optical anisotropy and the N-I point. One or more of the liquid crystal compounds represented by formula (II) are used to provide the second liquid crystal material.

A phenylcyclohexane liquid crystal compound and a cyclohexane phenyl ethane liquid crystal compound which are represented by formulas (III) and (IV) are used for decreasing viscosity and preventing crystal precipitation in a low-temperature atmosphere:

(III)

and

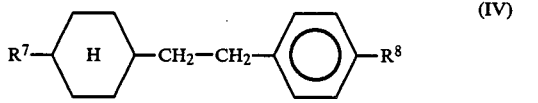

(IV)

wherein each of $R^5$ and $R^7$ independently represents a straight-chain alkyl group having 2 to 5 carbon atoms, $R^6$ represents a straight-chain alkyl or alkoxy group having 2 to 5 carbon atoms, or $-O-CH_2-CH=CH-CH_3$, and $R^8$ represents an alkoxy group having 2 to 4 carbon atoms.

Of the liquid crystal compounds represented by formula (III), a compound having the alkyl or alkoxy group as $R^6$ has a small optical anisotropy $\Delta n$ of about 0.08. However, it has a low viscosity of 4 to 10 cp, and an N-I point of 40° C. or lower. Therefore, this liquid crystal compound is used to decrease the viscosity of the resultant liquid crystal composition.

Of the liquid crystal compounds represented by formula (III), a compound having $-O-CH_2-CH=CH-CH_3$ as $R^6$ has a relatively high viscosity of 11 to 16 cp. However, it has a relatively large optical anisotropy $\Delta n$ of about 0.1, a relatively high N-I point of 54° to 67° C., and good compatibility with a tolan liquid crystal compound. Therefore, this liquid crystal compound is used to improve compatibility of the liquid crystal composition, i.e., stability in the low-temperature atmosphere while the optical anisotropy $\Delta n$ is kept large.

The liquid crystal compound represented by formula (IV) has a small optical anisotropy of about 0.08. However, it has a relatively low viscosity of 9 to 13 cp, good compatibility with a tolan liquid crystal compound, and an N-I point of 33° to 46° C. This liquid crystal compound is used to decrease the viscosity and improve stability of the liquid crystal composition in a low-temperature atmosphere.

Of the liquid crystal compounds represented by formulas (III) and (IV), at least one compound is used to provide the third liquid crystal material.

The NP liquid crystal compound for making large a positive dielectric anisotropy $\Delta\epsilon$ of the composition includes phenylcyclohexane liquid crystal compound, a biphenyl liquid crystal compound, and a pyrimidine liquid crystal compound, each having cyano group, as represented by formulas (V), (VI), and (VII):

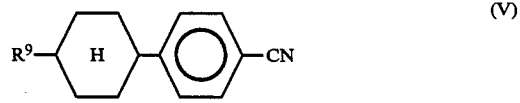

(V)

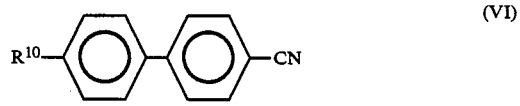

(VI)

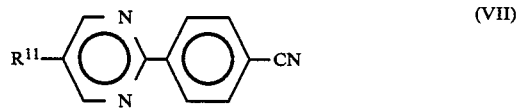

(VII)

wherein each of $R^9$ and $R^{10}$ independently represents a straight-chain alkyl group having 2 to 5 carbon atoms, and $R^{11}$ represents a straight-chain alkyl group having 4 to 7 carbon atoms.

The liquid crystal compound represented by formula (V) has a small dielectric anisotropy $\Delta\epsilon$ of 10 to 14 among the NP liquid crystal compounds. However, among Np liquid crystal compounds having a large positive value of $\Delta\epsilon$ the compound represented by formula (V) has a low viscosity of 20 to 30 cp, a relatively large optical anisotropy $\Delta n$ of 0.11 to 0.13, and good compatibility with a tolan liquid crystal compound. Although a liquid crystal compound represented by formula (VI) has a relatively large optical anisotropy $\Delta n$ of about 0.19, a relatively large dielectric anisotropy $\Delta\epsilon$ of about 12–14, and a relatively low viscosity of 0 to 30 cp, its compatibility with a tolan liquid crystal compound is slightly poor. A liquid crystal compound represented by formula (VII) has a relatively large dielectric anisotropy $\Delta\epsilon$ of 20 or more and a large optical anisotropy $\Delta n$ of 0.19 or more. However, its viscosity is also as high as 30 cp or more.

The liquid crystal compounds represented by formulas (V), (VI), and (VII) are NP liquid crystal compounds having large positive $\Delta\epsilon$ values. These NP liquid crystal compounds are selectively used in accordance with the required properties of the liquid crystal composition. At least one of these liquid crystal compounds is used to provide the fourth liquid crystal material.

The first to fourth liquid crystal materials comprising the above-mentioned liquid crystal compounds are mixed such that the dielectric anisotropy of the resultant liquid crystal composition becomes positive in the following manner. 30 to 60 wt % of the first liquid crystal material, 1 to 20 wt % of the second liquid crystal material, 10 to 30 wt % of the third liquid crystal material, and 5 to 50 wt % of the fourth liquid crystal material are mixed to prepare a desired liquid crystal composition. The content of the first liquid crystal material preferably falls within the range of 43 to 57 wt %. The content of the second liquid crystal material preferably falls within the range of 3 to 13 wt %. The content of the third liquid crystal material preferably falls within the range of 12 to 25 wt %. The content of the fourth liquid crystal material preferably falls within the range of 9 to 29 wt %.

The first to fourth liquid crystal materials mixed within the above ranges comprise the following liquid crystal compounds. The first liquid crystal material comprises a liquid crystal compound having an alkyl group as $R^2$ in formula (I), or a liquid crystal compound having an alkoxy group as $R^2$ and mixed with the compound having an alkyl group as $R^2$. In latter case, the content of the liquid crystal compound having an alkyl group as $R^2$ falls within the range of 10 to 30 wt % and the content of the liquid crystal compound having an alkoxy group as $R^2$ falls within the range of 20 to 60 wt %.

The third liquid crystal material comprises 12 to 22 wt % of only a liquid crystal compound represented by formula (III), or 10 to 25 wt % of a liquid crystal compound represented by formula (III) and 5 to 15 wt % of a liquid crystal compound represented by formula (IV). The liquid crystal compound represented by formula (III) contains: 10 to 20 wt % of a liquid crystal compound having an alkoxy group as $R^6$: 15 to 25 wt % of a liquid crystal compound having an alkoxy group as $R^6$; or 15 to 20 wt % of a liquid crystal compound having the alkoxy group as $R^6$ and 3 to 5 wt % of a liquid crystal compound having the alkyl group as $R^6$. In addition, 5 to 15 wt % of a liquid crystal compound having $-O-CH_2-CH=CH-CH_3$ as $R^6$ in formula (III) may further be mixed in the third liquid crystal material as needed. If a liquid crystal compound having an alkoxy group as $R^6$ in formula (III) is mixed with a liquid crystal compound having $-O-CH_2-CH=CH-C_3$ as $R^6$, their contents preferably fall within the range of 10 to 15 wt %, respectively. If a liquid crystal compound having an alkyl group as $R^6$, a liquid crystal compound having an alkoxy group as $R^6$, and a liquid crystal compound having $-O-CH_2-CH=CH-CH_3$ as $R^6$ are used, their contents preferably fall within the ranges of 7 to 10 wt %, 3 to 5 wt %, and 10 to 15 wt %, respectively. If the third liquid crystal material contains liquid crystal compound represented by formulas (III) and (IV), the contents of a liquid crystal compound having an alkoxy group as $R^6$ in formula (III) and a liquid crystal compound represented by formula (IV) fall within the range of 10 to 15 wt % each. When a liquid crystal compound having $-O-CH_2-CH=CH-CH_3$ as $R^6$ in formula (III) is mixed with a liquid crystal compound represented by formula (IV), their contents preferably fall within the range of 10 to 15 wt % each. If a liquid crystal compound having an alkoxy group as $R^6$ in formula (III), a liquid crystal compound having $-O-CH_2-CH=CH-CH_3$ as $R^6$ in formula (III), and a liquid crystal compound represented by formula (IV) are mixed, their contents preferably fall within the ranges of 7 to 10 wt %, 5 to 10 wt %, and 5 to 10 wt %, respectively.

The fourth liquid crystal material mainly contains a liquid crystal compound represented by formula (V). If only a liquid crystal compound represented by formula (V) is used, its content preferably falls within the range of 10 to 20 wt %. In addition to the liquid crystal compound represented by formula (V), a liquid crystal compound represented by formula (VI) and a liquid crystal compound represented by formula (VII) can be optionally added to provide the fourth liquid crystal material.

In this case, the liquid crystal compounds represented by formulas (V) and (VI) are mixed in an amount of, preferably, 10 to 30 wt % and 3 to 10 wt %, respectively. The liquid crystal compounds represented by formulas (V) and (VII) are mixed in an amount of, preferably, 5 to 15 wt % and 4 to 15 wt %, respectively. If a liquid crystal compound represented by formula (VI) is mixed with a liquid crystal compound represented by formula (VII), their contents preferably fall within the ranges of 4 to 6 wt % and 3 to 5 wt %, respectively.

Preferable liquid crystal compounds and their contents for preparing low-viscosity liquid crystal compositions having large values of optical anisotropy are as follows. The first liquid crystal material contains 20 to 60 wt % of a liquid crystal compound having an alkoxy group as $R^2$ in formula (I) and optionally 10 to 30 wt % of a liquid crystal compound having an alkyl group as $R^2$. The second liquid crystal material contains 3 to 15 wt % of a liquid crystal compound represented by formula (II). The third liquid crystal material contains 10 to 20 wt % of a liquid crystal compound having an alkoxy group as Rb in formula (III) and optionally 3 to 22 wt % of a liquid crystal compound having an alkyl group as $R^6$. The fourth liquid crystal material contains 5 to 25 wt % of a liquid crystal compound represented by formula (V). 5 to 25 wt % of a liquid crystal compound represented by formula (VI) and 10 to 30 wt % of a liquid crystal compound represented by formula (VII) are optionally mixed in the fourth liquid crystal material.

In order to prepare a liquid crystal composition having a small ratio $\Delta\epsilon/\epsilon_\perp$, high stability in a low-temperature atmosphere, a low viscosity, and a short response time, the third and fourth liquid crystal materials contain the following liquid crystal compounds in the following amounts.

The third liquid crystal material contains 10 to 15 wt % of a liquid crystal compound having an alkyl or alkoxy group as $R^6$ in formula (III) and 10 to 15 wt % of a liquid crystal compound having $-O-CH_2-CH=CH-CH_3$ as $R^6$. The fourth liquid crystal material contains 5 to 15 wt % of a liquid crystal compound represented by formula (V) and 3 to 5 wt % of a liquid crystal compound represented by formula (VII).

The third liquid crystal material contains 5 to 15 wt % of a liquid crystal compound having an alkyl or alkoxy group as $R^6$ in formula (III) and 10 to 15 wt % of a liquid crystal compound having $-O-CH_2-CH=CH-CH_3$ as $R^6$. The fourth liquid crystal material contains 5 to 15 wt % of a liquid crystal compound represented by formula (V). 3 to 6 wt % of a liquid crystal compound represented by formula (VI) and 3 to 5 wt % of a liquid crystal compound represented by formula (VII) are optionally contained in the fourth liquid crystal material.

The liquid crystal compositions described above have excellent properties, e.g., a large optical anisotropy of 0.18 or more and a low viscosity of 21 cp or less.

The liquid crystal compositions according to the present invention will be described by way of their examples.

The liquid crystal compositions having large values of optical anisotropy $\Delta n$ and low viscosities will be described below.

Twelve liquid crystal compositions were prepared by mixing the liquid crystal compounds (wt %) shown in Table 1, and physical properties of the compositions and electro-optical properties of liquid crystal display devices using these liquid crystal compositions were measured. Results are summarized in Table 2.

The crystal composition of Example 1 was prepared such that as liquid crystal compounds having large $\Delta n$ a liquid crystal compound represented by formula (I) having a relatively low viscosity, a liquid crystal compound having a high N-I point and a low viscosity, and serving as a high-temperature liquid crystal represented by formula (II), and a liquid crystal compound serving as a low-viscosity liquid crystal represented by formula (III) were used to widen a temperature range of the nematic phase, and decrease the viscosity, while maintaining a large $\Delta n$. Further, liquid crystal compounds represented by formulas (V) and (VI) as Np-type liquid crystal compounds having low viscosities and high values of $\Delta n$ were added. Thus, the temperature range of the nematic phase was widened while the value of dielectric anisotropy $\Delta \epsilon$ was kept large and positive and the viscosity was kept low, as a whole.

The liquid crystal composition of Example 2 was prepared by increasing contents of the liquid crystal compound having a large $\Delta n$ and an alkoxy group as $R^2$, and represented by formula (I) and the Np-type liquid crystal compound having a large $\Delta n$ and represented by formula (VI), thereby further increasing the value of $\Delta n$.

The liquid crystal composition in Example 3 was prepared by increasing contents of the liquid crystal compound represented by formula (I) in which $R^2$ represented an alkoxy group, and the p-type liquid crystal compound represented by formula (VI), thereby obtaining a larger $\Delta n$. At the same time, of the liquid crystal compounds represented by formula (III), compound (15) having an alkyl group $R^6$ ($R^6$ represents ethyl) was used to further decrease the viscosity.

The liquid crystal composition of Example 4 was prepared by adding compounds (2) and (5) having different carbon atoms in $R^1$ and $R^2$ in addition to the liquid crystal compound represented by formula (I) in which $R^2$ represented an alkoxy group as in Example 1, thereby widening the temperature range of the nematic phase and decreasing the viscosity. The viscosity, crystallinity and smecticity (the probability that smectic phase appears in the compound) of the liquid crystal compounds represented by formula (I) in which $R^1$ represents an alkyl group and $R^2$ represents an alkoxy group are different in terms of low-temperature properties according to the numbers of carbon atoms of $R^1$ and $R^2$. In general, when the numbers of carbon atoms of $R^1$ and $R^2$ are large, the smecticity is enhanced. When the numbers of carbon atoms of $R^1$ and $R^2$ are small, the crystallinity is enhanced. Even if the total numbers of carbon atoms of $R^1$ plus $R^2$ are the same, the viscosity and the transition point slightly vary depending on a balance between the numbers of carbon atoms of the alkyl and alkoxy groups. Therefore, in Example 4, compounds (2) and (5) having good combinations of the numbers of carbon atoms in $R^1$ (alkyl group) and $R^2$ (alkoxy group) were used for widening the temperature range and decreasing the viscosity.

The liquid crystal composition of Example 5 was prepared such that the content of the high-temperature liquid crystal compound represented by formula (II) was decreased in the liquid crystal composition of Example 4, and that the content of the liquid crystal compound having an alkyl group as $R^2$ and represented by formula (I) was increased, thereby further decreasing the viscosity.

The liquid crystal composition of Example 6 was prepared by using a p-type liquid crystal compound represented by formula (VII), thereby greatly increasing optical anisotropy $\Delta n$. However, the liquid crystal composition of Example 6 has a slightly higher viscosity than those of the liquid crystal compositions of Examples 1 to 5.

Liquid crystal compositions of Examples 7 and 8 were prepared such that the content of the p-type liquid crystal compound represented by formula (VII) was decreased in the liquid crystal composition of Example 6, and that of compound (15) of the low-viscosity liquid crystal compounds represented by formula (III) was increased. The liquid crystal compositions of Examples 7 and 8 serve as low-viscosity liquid crystal compositions.

Liquid crystal compositions of Examples 9 and 10 were prepared such that a liquid crystal compound having an alkoxy group as $R^2$ and represented by formula (I) was used in the liquid crystal compositions of Examples 6 to 8. Therefore, the liquid crystal compositions in Examples 9 and 10 serve as low-viscosity compositions while high $\Delta n$ values are maintained.

Liquid crystal compounds having large values of optical anisotropy $\Delta n$ and represented by formulas (I) and (II) and an Np liquid crystal compound having a relatively large value of optical anisotropy $\Delta n$ were used to prepare a liquid crystal composition having a low viscosity and a large value of optical anisotropy $\Delta n$ in Example 11. The value of dielectric anisotropy $\Delta \epsilon$ of this liquid crystal composition was 3.3.

The liquid crystal composition of Example 12 was prepared to aim at decreasing ratio $\Delta \epsilon / \epsilon_\perp$ so as to improve the $\gamma$ characteristic. For this purpose, the contents of the liquid crystal compounds having large values of dielectric anisotropy $\Delta \epsilon$ and represented by formulas (VI) and (VII) were decreased, and the value of dielectric anisotropy $\Delta \epsilon$ of the composition was set to be as small as 1.7.

As is apparent from the various measurement results shown in Table 2, the values of optical anisotropy $\Delta n$ of these liquid crystal compositions are as high as 0.18 or more, and viscosities thereof are as low as 21 cp or less. When the values of $\Delta nd$ of the liquid crystal display devices using these liquid crystal compositions are set to be 1.4 to 1.5 or higher, wavelength dependency of the transmitted light can be reduced. Since the values of optical anisotropy $\Delta n$ of the liquid crystal composition are large, the liquid crystal layer thicknesses can be decreased. In addition, since these compositions have low viscosities, the response time is 38 msec or less.

As described above, the ratio $\Delta \epsilon / \epsilon_\perp$ must be decreased to improve the $\gamma$ characteristic of the liquid crystal display devices. As described with reference to Example 12, the $\gamma$ characteristic of the liquid crystal display device using a liquid crystal composition having a small ratio $\Delta \epsilon / \epsilon_\perp$ is 1.085. As shown in Example 11, the $\gamma$ characteristic of the liquid crystal display device using the liquid crystal composition having a large dielectric anisotropy $\Delta \epsilon$ is 1.100. It is thus apparent that the better characteristic can be obtained when the ratio $\Delta \epsilon / \epsilon_\perp$ is decreased. However, when the content of the Np liquid crystal composition is simply decreased to decrease the value of dielectric anisotropy $\Delta \epsilon$ while the value of optical anisotropy $\Delta n$ is kept large, compatibility of the resultant liquid crystal composition is degraded, and crystals tend to precipitate at a low temperature. In order to improve compatibility, of the liquid crystal compounds having good compatibility with other liquid crystal compounds and represented by formula (III), a compound having —O—CH$_2$—CH=CH—CH$_3$ as R$^6$ and/or a liquid crystal compound represented by formula (IV) can be optionally added.

Examples of the liquid crystal composition for improving the γ characteristic are listed in Table 3. These examples are nine liquid crystal compositions prepared by mixing the liquid crystal compounds (Table 3) in amounts (wt %) shown in Table 3. The physical properties of the liquid crystal compositions and electro-optical properties of the liquid crystal display elements using these liquid crystal compositions were measured. Results are summarized in Table 4.

In liquid crystal compositions of Examples 13 and 14, of the third liquid crystal materials, liquid crystal compounds (16), (17) and (18) of the compounds represented by formula (III) and having —O—CH$_2$—CH=CH—CH$_3$ as R$^6$ or liquid crystal compounds (19), (20), and (21) represented by formula (IV) were used to reduce crystallinity of the resultant liquid crystal compositions. As a result, the γ characteristics of these liquid crystal compositions and their low-temperature characteristics can be improved.

A liquid crystal composition in Example 15 was prepared by using liquid crystal compound (24) of the compounds represented by formula (VI) and having large values of optical anisotropy Δn as compared with Example 14, thereby further increasing the value of optical anisotropy Δn.

The liquid crystal composition of the present invention can be prepared without using the liquid crystal compound represented by formula (III) in the third liquid crystal material, as is exemplified in Examples 16, 17, and 20. Liquid crystal compositions in Examples 16, 17, and 20 were prepared by mixing liquid crystal compounds (16), (17) and/or (18) and/or liquid crystal compounds (19), (20) and/or (21) represented by formula (IV) in place of liquid crystal compounds (13), (14) and (15) represented by formula (III). These liquid crystal compositions were prepared by mixing liquid crystal compounds (16), (17), and (18) having large values of optical anisotropy Δn, and the compositions have larger values of optical anisotropy Δn. Of these liquid crystal compositions, the compositions in Examples 17 and 20 contain liquid crystal compounds (25), (26), and (27) having large values of optical anisotropy Δn and represented by formula (VI) as the NP liquid crystal compounds and additionally contains liquid crystal compound (24) represented by formula (VI). Therefore, the values of optical anisotropy Δn of the compositions in Examples 17 and 20 are particularly large. The liquid crystal compositions in Examples 18 and 19 are prepared by mixing liquid crystal compounds (16), (17), and (18) having large values of optical anisotropy Δn and represented by formula (III), or liquid crystal compounds (19), (20), and (21) having low viscosities and represented by formula (IV). The value of optical anisotropy Δn of the composition in Example 18 is large, while the composition in Example 19 serves as a low-viscosity liquid crystal composition. A low-viscosity liquid crystal composition was obtained in Example 21 by mixing liquid crystal compound (13) represented by formula (III).

Even if these liquid crystal compositions were exposed at −25° C. or less for 10 days, no crystal precipitation occurred. Therefore, it is found that stability of the liquid crystal phase at low temperatures is excellent.

As is apparent from Table 4 representing various properties of the liquid crystal compositions in Examples 13 to 21, the values of optical anisotropy Δn are as high as 0.19 or more, and their viscosities are as low as 18 cp or less. Although the values of dielectric anisotropy Δε are small, the response times are short due to low viscosities. In addition, the γ characteristics are good due to small ratios Δε/ε$_\perp$.

Of Examples 13 to 21, the liquid crystal compositions in Examples 13, 14, 15, 18, 19, and 21 using liquid crystal compounds (13), (14), and (15) having an alkyl or alkoxy group as R$^2$ in the third liquid crystal material have lower viscosities and shorter response times as compared with the liquid crystal compositions in Examples 16, 17, and 20. Therefore, it is preferable that compounds (13), (14), and (15) represented by formula (III) are mixed with compounds (16), (17), and/or (18) represented by formula (III), or with compounds (19), (20), and/or (21) represented by formula (IV) in order to manufacture high-speed liquid crystal display elements for displaying a television image with a response time of 30 msec or less.

TABLE 1

| Material | Type of Compound | | Compound | Example 1 | Example 2 | Example 3 | Example 4 |
| --- | --- | --- | --- | --- | --- | --- | --- |
| First Liquid Crystal Material | Compound Represented by Formula (I) and Containing Alkoxy Group as R$^2$ | (1) | 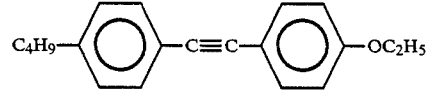 C$_4$H$_9$—⟨○⟩—C≡C—⟨○⟩—OC$_2$H$_5$ | 8.0 | 10.8 | 12.5 | 3.9 |
| | | (2) | 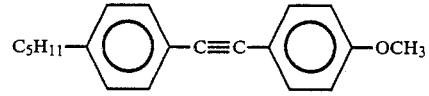 C$_5$H$_{11}$—⟨○⟩—C≡C—⟨○⟩—OCH$_3$ | | | | 4.0 |
| | | (3) | 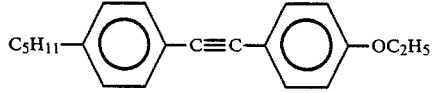 C$_5$H$_{11}$—⟨○⟩—C≡C—⟨○⟩—OC$_2$H$_5$ | 5.0 | 8.0 | 9.5 | 7.8 |

TABLE 1-continued

| Material | Type of Compound | | Compound | Example 1 | Example 2 | Example 3 | Example 4 |
|---|---|---|---|---|---|---|---|
| | | (4) | $C_3H_7$—⟨⟩—C≡C—⟨⟩—$OC_2H_5$ | 10.0 | 10.0 | 10.5 | 9.7 |
| | | (5) | $C_3H_7$—⟨⟩—C≡C—⟨⟩—$OC_5H_{11}$ | | | | 3.9 |
| | Compound Represented by Formula (I) and Containing Alkyl Group as $R^2$ | (6) | $C_2H_5$—⟨⟩—C≡C—⟨⟩—$C_3H_7$ | 5.0 | 3.8 | 3.7 | 3.7 |
| | | (7) | $C_2H_5$—⟨⟩—C≡C—⟨⟩—$C_4H_9$ | 5.0 | 3.8 | 3.7 | 3.7 |
| | | (8) | $C_2H_5$—⟨⟩—C≡C—⟨⟩—$C_5H_{11}$ | 5.0 | 3.8 | 3.7 | 3.7 |
| | | (9) | $C_3H_7$—⟨⟩—C≡C—⟨⟩—$C_4H_9$ | 5.0 | 3.8 | 3.7 | 3.7 |
| Second Liquid Crystal Material | Compound Represented by Formula (II) | (10) | $C_4H_9$—⟨H⟩—⟨⟩—C≡C—⟨⟩—$CH_3$ | 3.0 | | 2.7 | 3.3 |
| | | (11) | $C_3H_7$—⟨H⟩—⟨⟩—C≡C—⟨⟩—$C_2H_5$ | 6.0 | 5.5 | 5.6 | 5.6 |
| | | (12) | $C_3H_7$—⟨H⟩—⟨⟩—C≡C—⟨⟩—$C_4H_9$ | | 2.4 | | |
| Third Liquid Crystal Material | Compound Represented by Formula (III) | (13) | $C_3H_7$—⟨H⟩—⟨⟩—$OC_2H_5$ | 19.0 | 20.0 | 12.0 | 20.0 |
| | | (14) | $C_3H_7$—⟨H⟩—⟨⟩—$OC_4H_9$ | | | | 5.0 |
| | | (15) | $C_3H_7$—⟨H⟩—⟨⟩—$C_2H_5$ | | | | 3.0 |

TABLE 2

| | | Example 1 | Example 2 | Example 3 | Example 4 | Example 5 | Example 6 |
|---|---|---|---|---|---|---|---|
| Physical | C(S)-N Point [°C.] | < −5 | < −5 | < −5 | < −5 | < −5 | < −5 |
| | N-I Point [°C.] | 55.7 | 57.6 | 57.4 | 58.3 | 57.5 | 56.6 |

TABLE 2-continued

|  |  | Example 1 | Example 2 | Example 3 | Example 4 | Example 5 | Example 6 |
|---|---|---|---|---|---|---|---|
| Properties | Viscosity [cP] (at 20° C.) | 16.1 | 16.2 | 15.5 | 16.9 | 15.1 | 21.0 |
|  | Optical Anisotropy ($\Delta n$) (at 25° C.) | 0.182 | 0.186 | 0.196 | 0.185 | 0.188 | 0.198 |
|  | *Threshold Voltage [V] | 2.00 | 2.03 | 2.15 | 2.12 | 2.10 | 2.21 |
| Electro-Optical Properties | Cell Thickness (d) [μm] | 7.55 | 7.39 | 7.37 | 7.44 | 7.45 | 7.41 |
|  | $\Delta n \cdot d$ | 1.37 | 1.37 | 1.44 | 1.38 | 1.40 | 1.47 |
|  | **Response Time [msec] | 29.5 | 30.7 | 31.5 | 31.9 | 29.0 | 38.0 |
|  | ***d Satisfying $\Delta n \cdot d = 1$ [μm] | 5.49 | 5.38 | 5.10 | 5.41 | 5.32 | 5.05 |

TABLE 3

| Type of Compound |  |  | Composition | Example 13 | Example 14 | Example 15 |
|---|---|---|---|---|---|---|
| First Liquid Crystal Material | Compound Represented by Formula (I) | (1) | 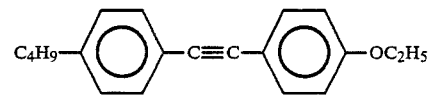 $C_4H_9$—⌬—C≡C—⌬—$OC_2H_5$ | 6.0 | 6.0 | 6.0 |
|  |  | (2) | 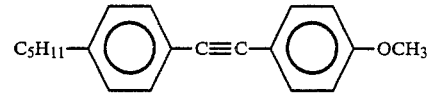 $C_5H_{11}$—⌬—C≡C—⌬—$OCH_3$ | 6.0 | 6.0 | 6.0 |
|  |  | (3) | 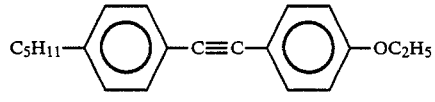 $C_5H_{11}$—⌬—C≡C—⌬—$OC_2H_5$ | 7.0 | 7.0 | 7.0 |
|  |  | (4) | 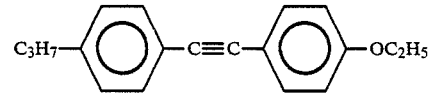 $C_3H_7$—⌬—C≡C—⌬—$OC_2H_5$ | 9.0 | 9.0 | 9.0 |
|  |  | (5) | 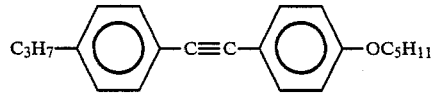 $C_3H_7$—⌬—C≡C—⌬—$OC_5H_{11}$ | 6.0 | 6.0 | 6.0 |
|  |  | (6) | 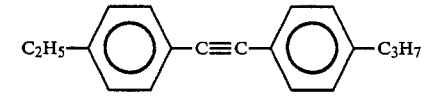 $C_2H_5$—⌬—C≡C—⌬—$C_3H_7$ | 5.0 | 5.0 | 5.0 |
|  |  | (7) | 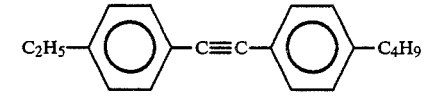 $C_2H_5$—⌬—C≡C—⌬—$C_4H_9$ | 5.0 | 5.0 | 5.0 |
|  |  | (8) | 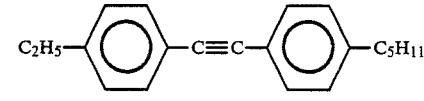 $C_2H_5$—⌬—C≡C—⌬—$C_5H_{11}$ | 5.0 | 5.0 | 5.0 |
|  |  | (9) | 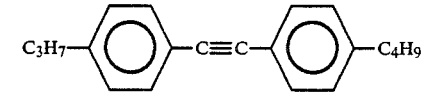 $C_3H_7$—⌬—C≡C—⌬—$C_4H_9$ | 5.0 | 5.0 | 5.0 |
| Second Liquid Crystal Material | Compound Represented by Formula (II) | (10) | 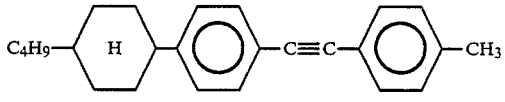 $C_4H_9$—H—⌬—C≡C—⌬—$CH_3$ | 5.0 | 5.0 | 5.0 |
|  |  | (11) | 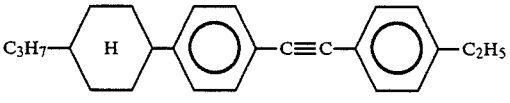 $C_3H_7$—H—⌬—C≡C—⌬—$C_2H_5$ | 5.0 | 5.0 | — |

TABLE 3-continued

| Type of Compound | | | Composition | Example 13 | Example 14 | Example 15 |
|---|---|---|---|---|---|---|
| | | (12) | C₃H₇—H—○—C≡C—○—C₄H₉ | — | — | 5.0 |
| Third Liquid Crystal Material | Compound Represented by Formula (III) | (13) | C₃H₇—H—○—OC₂H₅ | 11.0 | 11.0 | 11.0 |
| | | (14) | C₃H₇—H—○—OC₄H₉ | — | — | — |
| | | (15) | C₃H₇—H—○—C₂H₅ | — | — | — |

TABLE 4

| | | Example 13 | Example 14 | Example 15 | Example 16 | Example 17 | Example 18 |
|---|---|---|---|---|---|---|---|
| Physical Properties | C(S)-N Point [°C.] | < −5 | < −5 | < −5 | < −5 | < −5 | < −5 |
| | N-I Point [°C.] | 63.7 | 61.1 | 59.3 | 61.9 | 62.7 | 59.0 |
| | Viscosity [cP] (20° C.] | 17 | 16 | 16 | 17 | 18 | 17 |
| | Optical Anistropy (Δn) [λ = 589 nm, 20° C.] | 0.196 | 0.193 | 0.196 | 0.199 | 0.201 | 0.199 |
| | Dielectric Anisotropy (Δε) (20° C.) | 1.8 | 1.8 | 2.1 | 2.1 | 1.9 | 1.8 |
| Electro-optical Properties | *Threshold Voltage [V] | 2.6 | 2.5 | 2.5 | 2.5 | 2.6 | 2.6 |
| | Cell Thickness (d) [μm] | 7.4 | 7.5 | 7.4 | 7.4 | 7.4 | 7.5 |
| | Δn · d | 1.45 | 1.45 | 1.45 | 1.47 | 1.49 | 1.49 |
| | **Response Time [msec] | <30 | <30 | <30 | 32 | 33 | <30 |
| | ***γ Characteristic | 1.086 | 1.085 | 1.085 | 1.086 | 1.085 | 1.084 |

As has been described above, the liquid crystal compositions according to the present invention have low viscosities and large values of optical anisotropy. Therefore, the liquid crystal compositions of the present invention are suitable for time-divisionally driven liquid crystal display elements, and in particular, suitable for a matrix type field effect liquid crystal display devices driven at high duty for displaying a television image.

What is claimed is:

1. A liquid crystal composition having positive dielectric anisotropy, comprising:

30 to 60 wt % based on the total weight of said liquid crystal composition of a first liquid crystal material comprising at least one liquid crystal compound represented by formula (I):

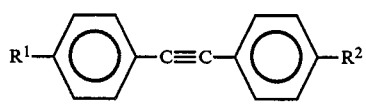

(I)

wherein R¹ represents a straight-chain alkyl group having 2 to 5 carbon atoms, and R² represents a straight-chain alkyl or alkoxy group having 1 to 5 carbon atoms;

1 to 20 wt % of a second liquid crystal material comprising at least one liquid crystal compound represented by formula (II):

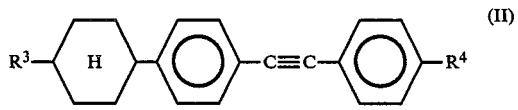

(II)

wherein R³ represents a straight-chain alkyl group having 2 to 4 carbon atoms and R⁴ represents a straight chain alkyl group having 1 to 4 carbon atoms;

10 to 30 wt % of a third liquid crystal material containing a liquid crystal compound represented by formula (III) and optionally a liquid crystal compound represented by formula (IV):

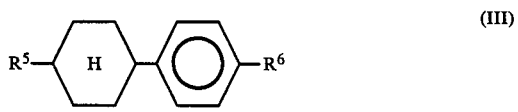

(III)

and

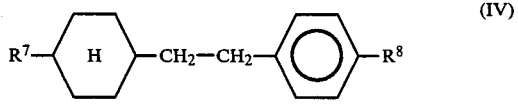

(IV)

wherein each of $R^5$ and $R^7$ independently represents a straight-chain alkyl group having 2 to 5 carbon atoms, $R^6$ represents a straight-chain alkyl or alkoxy group having 2 to 5 carbon atoms, or —O—CH$_2$—CH=CH—CH$_3$, and $R^8$ represents an alkoxy group having 2 to 4 carbon atoms; and 5 to 50 wt % of a fourth liquid crystal material containing at least one selected from liquid crystal compounds represented by formulas (V) to (VII):

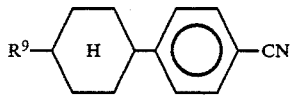
(V)

(VI)

and

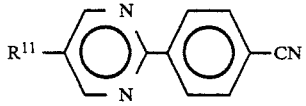
(VII)

wherein each of $R^9$ and $R^{10}$ independently represents a straight-chain alkyl group having 2 to 5 carbon atoms, and $R^{11}$ represents a straight-chain alkyl group having 4 to 7 carbon atoms, said liquid crystal composition, as a whole, having optical anisotrophy of at least 0.18.

2. The composition according to claim 1, containing 43 to 57 wt % of the first liquid crystal material, 3 to 13 wt % of the second liquid crystal material, 12 to 25 wt % of the third liquid crystal material, and 9 to 29 wt % of the fourth liquid crystal material.

3. The composition according to claim 1, wherein the first liquid crystal material contains 20 to 50 wt. % of a liquid crystal compound having an alkoxy group as $R^2$ in formula (I) and 10 to 30 wt. % of a liquid crystal compound having an alkyl group as $R^2$ in formula (I) with the total of first liquid crystal material components comprising 30 to 60 wt. % based on the total weight of said liquid crystal composition.

4. The composition according to claim 1, wherein the third liquid crystal material contains 12 to 22 wt % of a liquid crystal compound represented by formula (III).

5. The composition according to claim 4, wherein the third liquid crystal material contains 10 to 20 wt % of a liquid crystal compound having an alkoxy group as $R^6$ in formula (III).

6. The composition according to claim 1, wherein the third liquid crystal material contains 15 to 25 wt % of a liquid crystal compound having an alkoxy group as $R^6$ in formula (III).

7. The composition according to claim 1 wherein the third liquid crystal material contains 15 to 20 wt. % of a liquid crystal compound having an alkoxy group as $R^6$ in formula (III) and 3 to 5 wt. % of a liquid crystal compound having an alkyl group as $R^6$ in formula (III) with the total of third liquid crystal material components comprising 10 to 30 wt. % based on the total weight of said liquid crystal composition.

8. The composition according to claim 1, wherein the third liquid crystal material contains 10 to 15 wt. % of a liquid crystal compound having an alkoxy group as $R^6$ in formula (III) and 10 to 15 wt. % of a liquid crystal compound having —O—CH$_2$—CH=CH—CH$_3$ as $R^6$ in formula (III) with the total of third liquid crystal material components comprising 10 to 30 wt. % based on the total weight of said liquid crystal composition.

9. The composition according to claim 4, wherein the third liquid crystal material contains 3 to 5 wt. % of a liquid crystal compound having an alkyl group as $R^6$ in formula (III), 7 to 10 wt. % of a liquid crystal compound having an alkoxy group as $R^6$ in formula (III), and 10 to 15 wt. % of a liquid crystal compound having —O—CH$_2$—CH=CH—CH$_3$ as $R^6$ in formula (III) with the total of third liquid crystal material components comprising 10 to 30 wt. % based on the total weight of said liquid crystal composition.

10. The composition according to claim 1, wherein the third liquid crystal material contains 10 to 25 wt % of a liquid crystal compound represented by formula (III) and 5 to 15 wt % of a liquid crystal compound represented by formula (IV).

11. The composition according to claim 10, wherein the third liquid crystal material contains 10 to 15 wt % of a liquid crystal compound having an alkoxy group as $R^6$ in formula (III) and 10 to 15 wt % of a liquid crystal compound represented by formula (IV).

12. The composition according to claim 10, wherein the third liquid crystal material contains 10 to 15 wt % of a liquid crystal compound having —O—CH$_2$—CH=CH—CH$_3$ as $R^6$ in formula (III) and 10 to 15 wt % of a liquid crystal compound represented by formula (IV).

13. The composition according to claim 10, wherein the third liquid crystal material contains 7 to 10 wt. % of a liquid crystal compound having an alkoxy group as $R^6$ in formula (III), 5 to 10 wt. % of a liquid crystal compound having —OH—CH$_2$—CH=CH—CH$_3$ as $R^6$ in formula (III) with the total of third liquid crystal material components comprising 10 to 30 wt. % based on the total weight of said liquid crystal composition, and 5 to 10 wt. % of a liquid crystal compound represented by formula (IV).

14. The composition according to claim 1, wherein the fourth liquid crystal material contains 10 to 20 wt % of a liquid crystal compound represented by formula (V).

15. The composition according to claim 1, wherein the fourth liquid crystal material contains 10 to 30 wt. % of a liquid crystal compound represented by formula (V) and 3 to 10 wt. % of a liquid crystal compound represented by formula (VI) with the total of fourth liquid crystal material components comprising 5 to 50 wt % based on the total weight of said liquid crystal composition.

16. The composition according to claim 1, wherein the fourth liquid crystal material contains 5 to 15 wt. % of a liquid crystal compound represented by formula (V) and 4 to 15 wt. % of a liquid crystal compound represented by formula (VII) with the total of fourth liquid crystal material components comprising 5 to 50 wt. % based on the total weight of said liquid crystal composition.

17. The composition according to claim 1, wherein the fourth liquid crystal material contains 4 to 6 wt. % of a liquid crystal compound represented by formula (VI) and 3 to 5 wt. % of a liquid crystal compound represented by formula (VII) with the total of fourth liquid crystal material components comprising 5 to 50 wt. % based on the total weight of said liquid crystal composition.

18. The composition according to claim 1, wherein the first liquid crystal material contains 20 to 50 wt. % of a liquid crystal compound having an alkyl group as $R^2$ in formula (I) and 10 to 20 wt. % of a liquid crystal compound having an alkoxy group as $R^2$ in formula (I) with the total of first liquid crystal material components comprising 30 to 60 wt. % based on the total weight of said liquid crystal composition, the second liquid crystal material contains 3 to 15 wt. % of a liquid crystal compound represented by formula (II), the third liquid crystal material contains 10 to 20 wt. % of a liquid crystal compound having an alkyl group as $R^6$ in formula (III) and a liquid crystal compound having an alkoxy group as $R^6$ in formula (III) with the total of third liquid crystal material components comprising 10 to 30 wt. % based on the total weight of said liquid crystal composition, and the fourth liquid crystal material contains 5 to 25 wt. % of a liquid crystal compound represented by formula (V), and (i) 5 to 25 wt. % of a liquid crystal compound represented by formula (VI), or (ii) 15 to 25 wt. % of a liquid crystal compound represented by formula (VII) with the total of fourth liquid crystal material components comprising 5 to 50 wt. % based on the total weight of said liquid crystal composition.

19. The composition according to claim 1, wherein the first liquid crystal material contains 20 to 50 wt. % of a liquid crystal compound having an alkyl group as $R^2$ in formula (I) and 10 to 20 wt. % of a liquid crystal compound having an alkoxy group as $R^2$ in formula (I) with the total of first liquid crystal material components comprising 30 to 60 wt. % based on the total weight of said liquid crystal composition, the second liquid crystal material contains 3 to 15 wt. % of a liquid crystal compound represented by formula (II), the third liquid crystal material contains 10 to 15 wt. % of a liquid crystal compound having an alkyl or alkoxy group as $R^6$ in formula (III) and 10 to 15 wt. % of a liquid crystal compound having —O—CH$_2$—CH=CH—CH$_3$ as $R^6$ in formula (III) with the total of third liquid crystal material components comprising 10 to 30 wt. % based on the total weight of said liquid crystal composition, and the fourth liquid crystal material contains 5 to 15 wt. % of a liquid crystal compound represented by formula (V) and 3 to 5 wt. % of a liquid crystal compound represented by formula (VII) with the total of fourth liquid crystal material components comprising 5 to 50 wt. % based on the total weight of said liquid crystal composition.

20. The composition according to claim 1, wherein the first liquid crystal material contains 20 to 50 wt. % of a liquid crystal compound having an alkoxy group as $R^2$ in formula (I) and 10 to 20 wt. % of a liquid crystal compound having an alkyl group as $R^2$ in formula (I) with the total of first liquid crystal material components comprising 30 to 60 wt. % based on the total weight of said liquid crystal composition the second liquid crystal material contains 3 to 15 wt. % of a liquid crystal compound represented by formula (II), the third liquid crystal material contains 5 to 15 wt. % of a liquid crystal compound having an alkyl or alkoxy group as $R^6$ in formula (III) and 10 to 15 wt. % of a liquid crystal compound having —O—H—CH$_2$—CH=CH—CH$_3$ as $R^6$ in formula (III) with the total of third liquid crystal material components comprising 10 to 30 wt. % based on the total weight of said liquid crystal composition, and the fourth liquid crystal material contains at least one selected from the group consisting of (i) 5 to 15 wt. % of a liquid crystal compound represented by formula (V), (ii) 3 to 6 wt. % of a liquid crystal compound represented by formula (VI) and (iii) 3 to 5 wt. % of a liquid crystal compound represented by formula (VII) with the total of fourth liquid crystal material components comprising 5 to 50 wt. % based on the total weight of said liquid crystal composition.

21. The composition according to claim 1, wherein said liquid crystal composition has a viscosity of 21 cp or less.

22. The composition according to claim 1, wherein said liquid crystal composition does not contain compounds having an ester bond.

23. The composition according to claim 1, wherein said first liquid crystal material consists of only a liquid crystal compound represented by formula (I) in which $R^2$ is an alkoxy group.

24. The composition according to claim 1, wherein the first liquid crystal material contains 30 to 60 wt. % of a liquid crystal compound having an alkoxy group as $R^2$ in formula (I), the second liquid crystal material contains 3 to 15 wt % of a liquid crystal compound represented by formula (II), the third liquid crystal material contains 15 to 20 wt. % of a liquid crystal compound having an alkoxy group as $R^6$ in formula (III) and 3 to 5 wt. % of a liquid crystal compound having an alkyl group as $R^6$ in formula (III) with the total of third liquid crystal material component comprising 10 to 30 wt. % based on the total weight of said liquid crystal composition, and the fourth liquid crystal material contains 5 to 15 wt. % of a liquid crystal compound represented by formula (V), and 9 to 12 wt. % of a liquid crystal compound represented by formula (VII) with the total of fourth liquid crystal material component comprising 5 to 50 wt. % based on the total weight of said liquid crystal composition.

25. The composition according to claim 1, wherein the first liquid crystal material contains 20 to 50 wt. % of a liquid crystal compound having an alkoxy group as $R^2$ in formula (I), and 10 to 30 wt. % of a liquid crystal compound having an alkyl group as $R^2$ in formula (I) with the total of first liquid crystal material component comprising 30 to 60 wt. % based on the total weight of said liquid crystal composition, the second liquid crystal material contains 3 to 15 wt. % of a liquid crystal compound represented by formula (II), the third liquid crystal material contains 10 to 25 wt. % of a liquid crystal compound having an alkoxy group as $R^6$ in formula (III), and the fourth liquid crystal material contains 10 to 30 wt. % of a liquid crystal compound represented by formula (V), and (i) 3 to 10 wt. % of a liquid crystal compound represented by formula (VI) or (ii) 9 to 12 wt. % of a liquid crystal compound represented by formula (VII) with the total of fourth liquid crystal material components comprising 5 to 50 wt. % based on the total weight of said liquid crystal composition.

26. The composition according to claim 2, wherein the sum of said first and second liquid crystal materials is at least 51.9 wt. %.

27. The composition according to claim 2, wherein the sum of said first and second liquid crystal materials is 51.9 to 66 wt. %.

* * * * *